(12) United States Patent
Aloush et al.

(10) Patent No.: US 8,644,135 B2
(45) Date of Patent: Feb. 4, 2014

(54) ROUTING AND TOPOLOGY MANAGEMENT

(75) Inventors: Avner Aloush, Netanya (IL); Aharona Lurie, Or Yehuda (IL); Ronald Bruce Sterenson, Ra'anana (IL)

(73) Assignee: Sigma Designs Israel S.D.I. Ltd, Tel Aviv, IL (US)

( * ) Notice: Subject to any disclaimer, the term of this patent is extended or adjusted under 35 U.S.C. 154(b) by 182 days.

(21) Appl. No.: 12/978,702

(22) Filed: Dec. 27, 2010

(65) Prior Publication Data

US 2011/0158085 A1  Jun. 30, 2011

Related U.S. Application Data

(60) Provisional application No. 61/290,228, filed on Dec. 27, 2009.

(51) Int. Cl.
- *G01R 31/08* (2006.01)
- *G06F 11/00* (2006.01)
- *G08C 15/00* (2006.01)
- *H04J 1/16* (2006.01)
- *H04J 3/14* (2006.01)
- *H04L 1/00* (2006.01)
- *H04L 12/26* (2006.01)

(52) U.S. Cl.
USPC ........... 370/225; 370/254; 370/216; 370/232; 370/328; 370/338; 370/385; 370/390; 370/462; 709/223; 709/224; 709/226; 709/242; 709/241

(58) Field of Classification Search
None
See application file for complete search history.

(56) References Cited

U.S. PATENT DOCUMENTS

| | | | |
|---|---|---|---|
| 6,041,049 A * | 3/2000 | Brady | 370/351 |
| 7,583,796 B2 | 9/2009 | Tomikawa et al. | |
| 2002/0165957 A1 | 11/2002 | Devoe et al. | |
| 2002/0173321 A1* | 11/2002 | Marsden et al. | 455/500 |
| 2005/0251401 A1* | 11/2005 | Shuey | 705/1 |
| 2006/0218301 A1 | 9/2006 | O'Toole et al. | |
| 2007/0165543 A1* | 7/2007 | Joo | 370/254 |
| 2007/0180105 A1* | 8/2007 | Filsfils et al. | 709/224 |
| 2007/0286097 A1 | 12/2007 | Davies | |
| 2008/0059637 A1 | 3/2008 | Gerstel et al. | |
| 2009/0100176 A1 | 4/2009 | Hicks, III et al. | |
| 2009/0196306 A1* | 8/2009 | King et al. | 370/462 |
| 2011/0099477 A1* | 4/2011 | Talaat | 715/733 |

OTHER PUBLICATIONS

Nesin, "QoS Part 3: What's special about HomePNA's Guaranteed Qos." In: HomePNA Blog [online], Jun. 20, 2008. Retrieved on Jun. 4, 2011 from the Internet at URL:<http://homepnablog.typead.com/my_weblog/2008/06/index.html>.

* cited by examiner

*Primary Examiner* — Ian N Moore
*Assistant Examiner* — Eric H Wang
(74) *Attorney, Agent, or Firm* — Eitan, Mehulal & Sadot

(57) ABSTRACT

A method for routing communications on a network node in a communications network includes: updating a central domain master regarding changes detected in topology, receiving a routing plan from the central domain master, where the routing plan is calculated at least in accordance with the changes, and transmitting data as necessary in accordance with the routing plan. A method implementable on a central domain master for routing communications between network nodes in a communications network includes receiving transmissions regarding changes detected in topology from the network nodes, calculating a routing plan based on at least the transmissions, and distributing the routing plan to the network nodes, where the central domain server is one of the network nodes.

20 Claims, 6 Drawing Sheets

| FROM\TO | 1 | 2 | 3 | 4 | 5 | 6 | 7 | 8 | 9 | 10 | 11 | 12 |
|---|---|---|---|---|---|---|---|---|---|---|---|---|
| 1  |   |   |   |   |   |   |   |   |   |    |    |    |
| 2  |   |   |   |   |   |   |   | 5 | 6 | 7  | 6  | 7  |
| 3  |   |   |   |   |   |   |   | 5 | 6 | 7  | 6  | 7  |
| 4  |   |   |   |   |   |   |   | 7 | 6 | 7  | 6  | 7  |
| 5  |   |   |   |   |   |   |   | 7 | 6 | 7  | 6  | 7  |
| 6  |   |   |   |   |   |   |   |   |   |    | 9  | 10 |
| 7  |   |   |   |   |   |   |   |   |   |    | 9  | 10 |
| 8  | 5 | 5 | 7 | 7 |   |   |   |   |   |    | 10 | 10 |
| 9  | 6 | 6 | 7 | 7 |   |   |   |   |   |    |    |    |
| 10 | 6 | 6 | 7 | 7 |   |   |   |   |   |    |    |    |
| 11 | 9 | 9 | 8 | 8 | 8 | 9 | 8 |   |   |    |    |    |
| 12 | 8 | 9 | 10| 10| 8 | 9 | 10|   |   |    |    |    |

FIG.6

ROUTING AND TOPOLOGY MANAGEMENT

CROSS-REFERENCE TO RELATED APPLICATIONS

This application claims benefit from U.S. Provisional Patent Application No. 61/290,228, filed Dec. 27, 2009, which is hereby incorporated in its entirety by reference.

FIELD OF THE INVENTION

The present invention relates to network routing generally and to routing in a noisy environment in particular.

BACKGROUND OF THE INVENTION

A network's topology describes the layout of the network and determines to a large extent how communications are routed from node to node on the network. Common examples of topologies include: star topologies, where communications are routed through a central or "master" node; bus topologies, where each node is connected to a common backbone or "bus"; and ring topologies, where each node is connected to two other nodes in a circular ring. A common feature of such topologies is that routing communications between participating nodes is relatively simple, the route from one node to another is typically dictated unambiguously by the topology itself.

Meshed topologies have layouts where at least some of the nodes have multiple possible paths to other nodes. Accordingly, they require routing logic to determine a preferred route for communication between two nodes. Such logic may include consideration for a number of factors including, for example, bandwidth, line quality, and the number of "hops" between the participating nodes. Typically, a distributed method may be implemented wherein some or all of the participating nodes periodically poll the "visible" network, i.e. the other nodes with which the polling node may effectively communicate. The polling results are then analyzed in order to at least partially optimize routing between the nodes.

G.hn data networks are designed to leverage previous investment in a home by operating over existing wiring typically found in homes, such as, for example, telephone wiring, coaxial cables and power lines. There is, however, a tradeoff for such leveraging. G.hn networks coexist with other technologies using the same wiring and the network's physical topology may typically be designed and implemented in accordance with the requirements of those technologies. For example, telephone wiring typically carries other analog and/or digital traffic and its coverage of the home may be limited—some rooms may not even have an outlet. Powerline implementations may be exposed to frequent power surges or spikes in accordance with the usage patterns of appliances sharing the same medium. Under such circumstances there may be frequent interference on the G.hn network.

Reference is now made to FIG. 1A which illustrates an exemplary topology 100 for a typical G.hn network. Areas A, B and C represent different logical areas within the network. Each such area represents a "fully meshed" subset of the network; each node in a given area may generally be capable of directly communicating with every other node in the same area. For example, nodes 10, 11, 12 13, 14, and 15 may all be in area A and capable of communicating with each other. Similarly, nodes 14-20 and nodes 19-23 may be in areas B and C respectively. The areas may overlap such that some nodes may be associated with more than one area. For example, nodes 14 and 15 may be in overlap area D, and may therefore directly communicate with each of the other nodes in both areas A and B.

There are instances of multiple possible routes between nodes in topology 100. For example, node 10 may use either node 14 or node 15 to "relay" a transmission to node 18. In fact, even if two nodes may be in the same area and therefore capable of direct communications, there may be other, possibly preferable, routing options. For example, the line between node 10 and node 13 may suffer from interference and/or have relatively low bandwidth. Such interference may be intermittent such that the connection between the nodes is unreliable. If, for example, topology 100 describes a powerline network, there may be a refrigerator located on the line between nodes 10 and 13. As the refrigerator's compressor turns on and off, the power on the line may surge and the connection between the nodes may temporarily break, or the effective rate may be lowered. In such a case, it may be preferable to route their mutual transmissions via node 11, even though a direct transmission path may at least nominally exist.

SUMMARY OF THE INVENTION

There is provided, in accordance with a preferred embodiment of the present invention, a method for routing communications on a network node in a communications network, the method including: updating a central domain master regarding changes detected in topology, receiving a routing plan from the central domain master, where the routing plan is calculated at least in accordance with the changes, and transmitting data as necessary in accordance with the routing plan.

Further, in accordance with a preferred embodiment of the present invention, the updating includes transmitting the changes according to a route included in the routing plan.

Still further, in accordance with a preferred embodiment of the present invention, the updating includes flooding the communications network with a transmission detailing the changes.

Additionally, in accordance with a preferred embodiment of the present invention, the flooding is performed only when the routing plan does not include a known usable route to the central domain master.

Moreover, in accordance with a preferred embodiment of the present invention, the flooding is performed whenever the changes are detected.

Further, in accordance with a preferred embodiment of the present invention, the flooding includes transmitting the changes to all other network nodes in direct communication with the network node, and indicating to the other network nodes that they should retransmit the changes to the central domain master, where the retransmitting is via at least one of a route from the routing plan, and repeating the flooding.

Still further, in accordance with a preferred embodiment of the present invention, the method also includes repeating the flooding until an indication is received that the central domain master received the changes.

Additionally, in accordance with a preferred embodiment of the present invention, the indication is an updated routing plan reflecting the changes received from the central domain master.

Moreover, in accordance with a preferred embodiment of the present invention, the method also includes detecting the changes via at least one of polling other network nodes, successfully communicating with other network nodes, experiencing a failed transmission with one other network node, and monitoring communications between at least two other network nodes.

Further, in accordance with a preferred embodiment of the present invention, the method also includes receiving at least one of a media access plan (MAP) and a repeated MAP (RMAP) generated by the central domain master, the MAP and RMAP including at least an indication of a most recent routing plan, and requesting an updated routing plan from the central domain master.

Still further, in accordance with a preferred embodiment of the present invention, the method also comprises initiating the updating when an indication does not indicate that the routing plan reflects at least the changes, where the indication is included as part of the routing plan.

Additionally, in accordance with a preferred embodiment of the present invention, the method also comprises interpreting null entries in the routing plan as direct connections between two network nodes, where the routing plan includes at least a node to node routing table.

Moreover, in accordance with a preferred embodiment of the present invention, the method also includes detecting a broken link in the routing plan, using the routing plan to calculate an alternate route that circumvents the broken link; and transmitting in accordance with the alternate route.

Further, in accordance with a preferred embodiment of the present invention, the communications network is a G.hn network.

There is also provided, in accordance with a preferred embodiment of the present invention, a method for routing communications between network nodes in a communications network, the method implementable on a central domain master, the method including receiving transmissions regarding changes detected in topology from the network nodes, calculating a routing plan based on at least the transmissions, and distributing the routing plan to the network nodes, where the central domain server is one of the network nodes.

Further, in accordance with a preferred embodiment of the present invention, the calculating includes determining preferred routes between each pair of the network nodes, and entering an indication of a first hop for each preferred route in the routing plan, where if necessary successive hops are determinable from other indications entered for other said pairs of network nodes along said preferred route.

Still further, in accordance with a preferred embodiment of the present invention, when the preferred route consists of only one hop, the indication is a null indication.

Additionally, in accordance with a preferred embodiment of the present invention, the communications network is a G.hn network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6 is a novel routing table, constructed and operative in accordance with a preferred embodiment of the present invention.

Figure 1A:
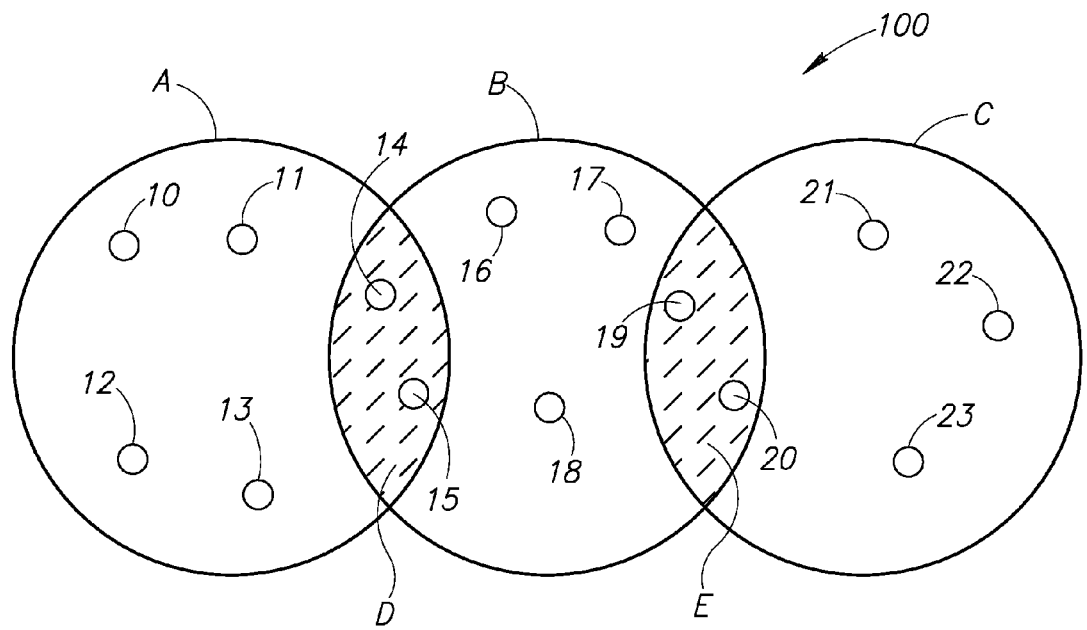
FIG. 1A is a schematic illustration of an exemplary network topology.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Some networks use domain masters (DMs) to provide centralized functionality for the network. For example, a domain master node may determine and distribute media access plans (MAPs) to prevent collisions caused by multiple nodes transmitting at the same time. Applicants have realized that the routing used by the nodes may be improved by designating one of the nodes as a central domain master (DM) for monitoring changes in topology and using this information to determine optimal routing plans. Topology information may be reported by each node to the domain master. In addition to the list of nodes that are accessible to the reporting node, the topology information may also include details of quality level of the link.

Figure 1B:
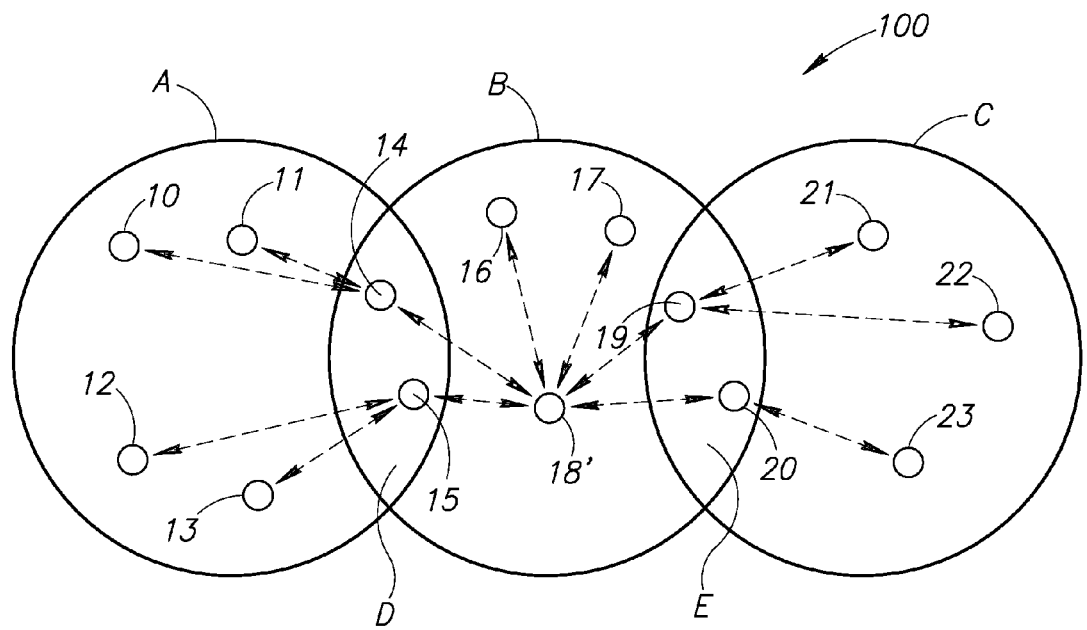
FIG. 1B is a schematic illustration of exemplary routing for updating a novel central domain master for the network of FIG. 1A.

Reference is now made to FIG. 1B which illustrates a preferred exemplary embodiment of the present invention, constructed and operative in accordance with a preferred embodiment of the present invention. Node 18 in area B (FIG. 1A) may be assigned as central domain master 18' for topology/routing in the network of topology 100. Domain master 18' may receive topology information directly from other nodes in area B. Nodes in areas A and C that may not have direct connections with DM 18', such as, for example, nodes 10-13 and nodes 21-23, may use the nodes in areas D and E to relay their topology information to DM 18'.

DM 18' may use the cumulative information to monitor the network's topology and to determine up-to-date optimal routing plans in accordance with the topology's current state. DM 18' may then distribute the current topology and routing plans to the other nodes in area B. Nodes in areas D and E may relay this information to the nodes in areas A and C which may not be directly connected to DM 18'. It will be appreciated that the routing plans calculated and distributed by DM 18' may themselves indicate the routes by which they are distributed to nodes not in direct contact with DM 18'.

In accordance with a preferred embodiment of the present invention, DM 18' may also determine and distribute MAPs for the network.

Figure 2:
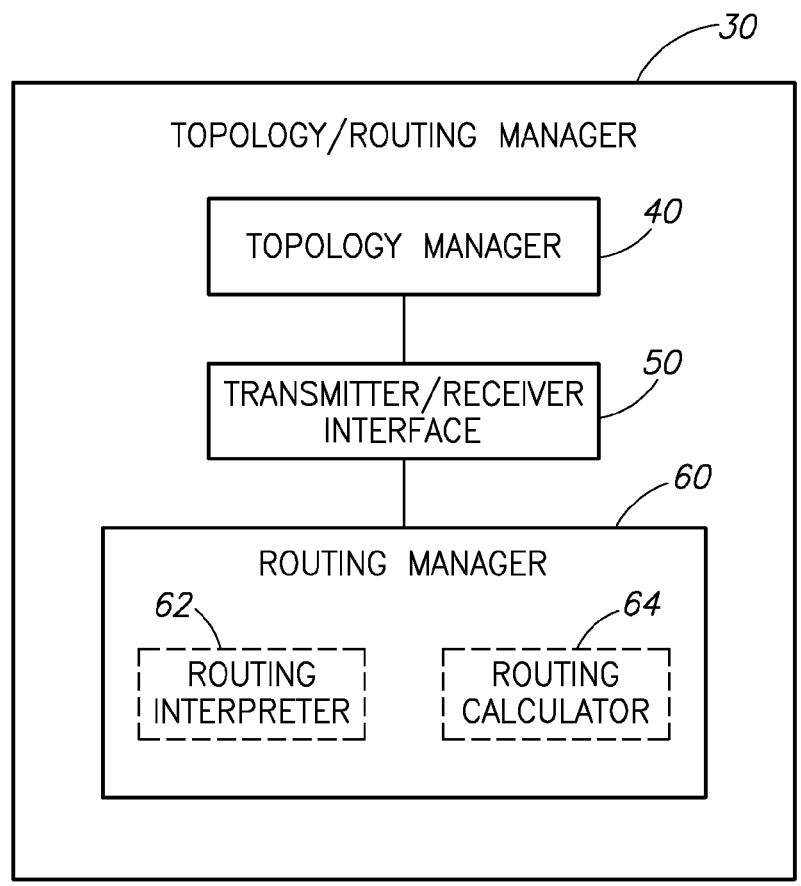
FIG. 2 is a novel topology/routing manager to communicate with the central domain master of FIG. 1B, constructed and operative in accordance with a preferred embodiment of the present invention.

Reference is now made to FIG. 2 which illustrates a novel topology/routing manager (TRM) 30, constructed and operative in accordance with a preferred embodiment of the present invention. TRM 30 may be implemented to provide node-level topology and routing management on a node participating in a G.hn network, such as, for example, node 10 in FIG. 1. TRM 30 may comprise a topology manager 40 and a routing manager 60. Routing manager 60 may comprise routing interpreter 62 and routing calculator 64. TRM 30 may also comprise a transmitter/receiver interface 50, which may enable TRM 30 to access built-in communications functionality as typically implemented on a network node.

Figure 3:
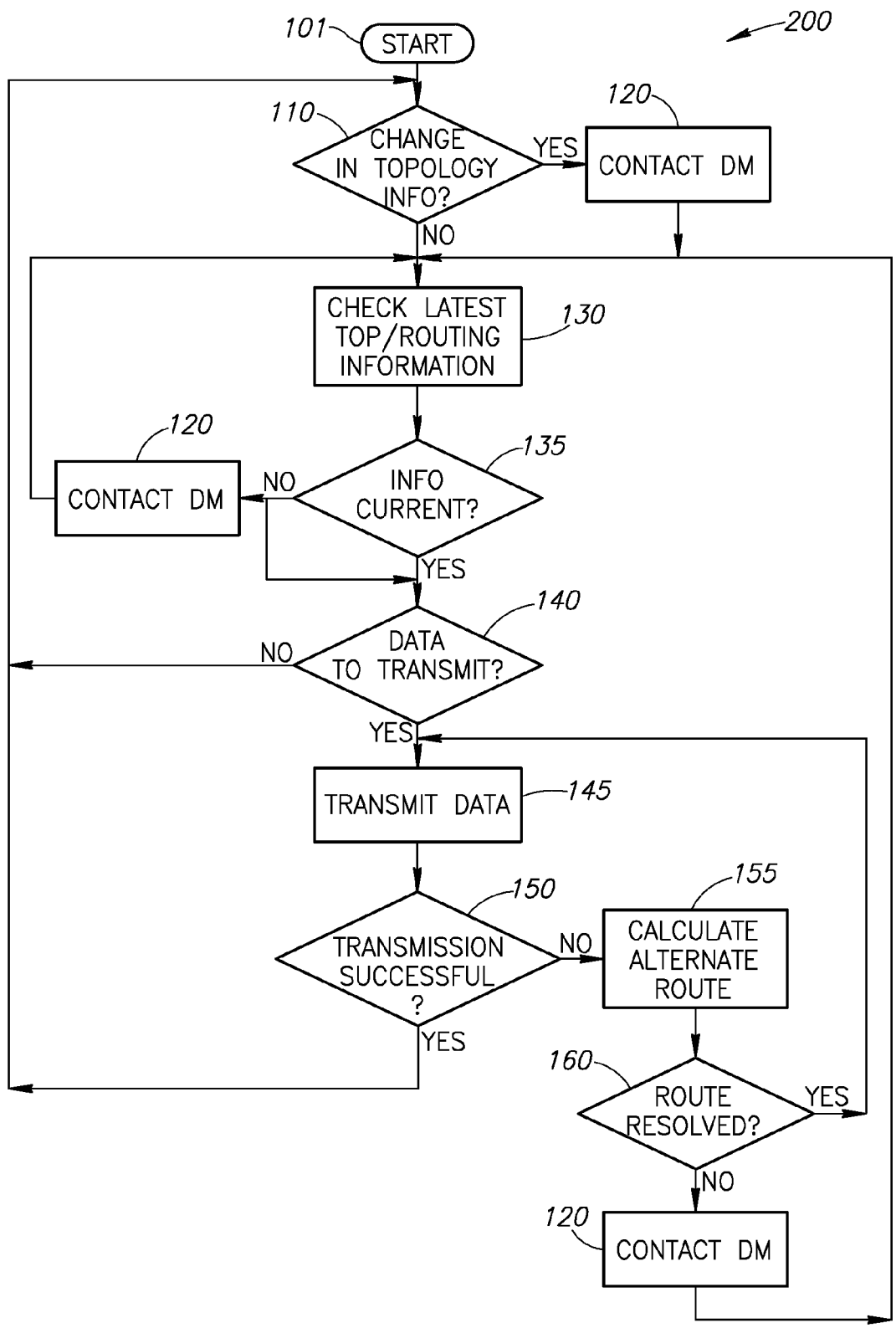
FIGS. 3 and 4 are novel processes to be executed on the topology/routing manager of FIG. 2.

Reference is now made to FIG. 3 which illustrates a novel centralized routing and topology management process 200, operative in accordance with a preferred embodiment of the present invention. Process 200 may be executed by TRM 30 on a node participating in a G.hn network, such as, for example, node 10 in FIG. 1. TRM 30 may start (step 101) process 200 as soon as node 10 registers to participate in the network, and may continue the process until the node resigns from participation.

Topology manager 40 may regularly use interface 50 to poll other network nodes to detect changes (step 110) in the node's topology. For example, in FIG. 1 node 10 may initially be in direct contact with nodes 11, 12, 13, 14 and 15, all of which may be located in area A. However, over time, the topology may change. For example, for whatever reason, node 10 may no longer directly contact another node in area A, for example, node 14. Similarly, circumstances may permit node 10 to eventually contact a node that may previously have been outside of area A, such as, for example, node 16.

If a change may be detected, domain master 18' may be contacted (step 120) with information relevant to the change. For example, a message may be sent to domain master 18' indicating that the direct link with node 11 may no longer be functioning. The details of how node 10 may contact DM 18' are discussed in detail hereinbelow.

If no change was detected, processing may continue. Topology manager 40 may periodically check (step 130) topology and routing information that it may receive from DM 18' via interface 50. Such information may include updated details of topology 100 and instructions for preferred routing of transmissions between participating nodes. It will be appreciated that the timing for the receipt of such information from the DM may be independent of the ongoing execution of process 200; topology manager 40 may receive such information from time to time whenever it may be sent by DM 18'.

It will be appreciated, that the polling required for step 110 may not necessarily be explicit; manager 40 may use data from any of the ongoing communications to/from node 10. Manager 40 may also use data that it may decode from the frame headers of transmissions that it may detect between other nodes.

Manager 40 may determine (step 135) whether the most recent topology information received from the DM is current. Such determination may be based on topology changes known to manager 40. For example, in step 110 manager 40 may have identified that node 10 may no longer be in communication with node 11. The most recently received topology/routing information may not be current if it does not reflect this change.

There may be other methods for determining that the topology/routing information may not be current. For example, in accordance with a preferred embodiment of the present invention, the DM may also calculate and distribute media access plans (MAPs). Each MAP may also include an indication, such as serial number or the like, regarding the most current version of the topology/routing information. Accordingly, manager 40 may check that the topology information is current by comparing its serial number to that included on the most recent MAP received from the DM.

If the topology/routing information may not be current, then TRM 30 may contact DM 18' via interface 50 with an update request in step 120, described in more detail hereinbelow. Once DM 18' may be contacted with the request, updated topology may eventually be received from the DM in step 130. It will be appreciated that step 120 may be performed in the background, or concurrently, with further processing. Accordingly, in accordance with a preferred embodiment of the present invention, processing may continue to step 140 regardless of whether or not the topology information is current. Alternatively, the processing of process 200 may enter a brief wait state before executing step 130, thus providing an opportunity for updated topology/routing information to be received from the DM.

TRM 30 may check interface 50 to determine whether or not there may be data to transmit (step 140) to any other node on the network. If there is no data to transmit, process 200 may loop back to step 110. If there is data to transmit, TRM 30 may attempt to transmit (step 145) via interface 50 as per the most recent topology information available. As discussed in detail hereinbelow, routing interpreter 62 may provide routing instructions for the transmission. If the transmission is successful (step 150), i.e. there are no "broken links" with the target node, process 200 may loop back to step 110. It will be appreciated that process 200 may pause for a pre-determined amount of time before continuing with a next processing cycle.

However, if the transmission is not successful, step 120 may be invoked to update DM 18' regarding the broken link with the target node. In parallel, TRM 30 may attempt to retransmit (step 145) the data to the target node. After several failed retries, routing manager 60 may invoke routing calculator 64 to calculate (step 155) an alternate route based on the current topology/routing information as known to TRM 30. If calculator 64 successfully resolves (step 160) a new route, processing may return to step 145 for transmission as per the calculated routing. If step 160 is unsuccessful, then step 120 may be invoked to request updated topology information from DM 18' and the process may loop back to step 130 to await the requested update.

Figure 4:
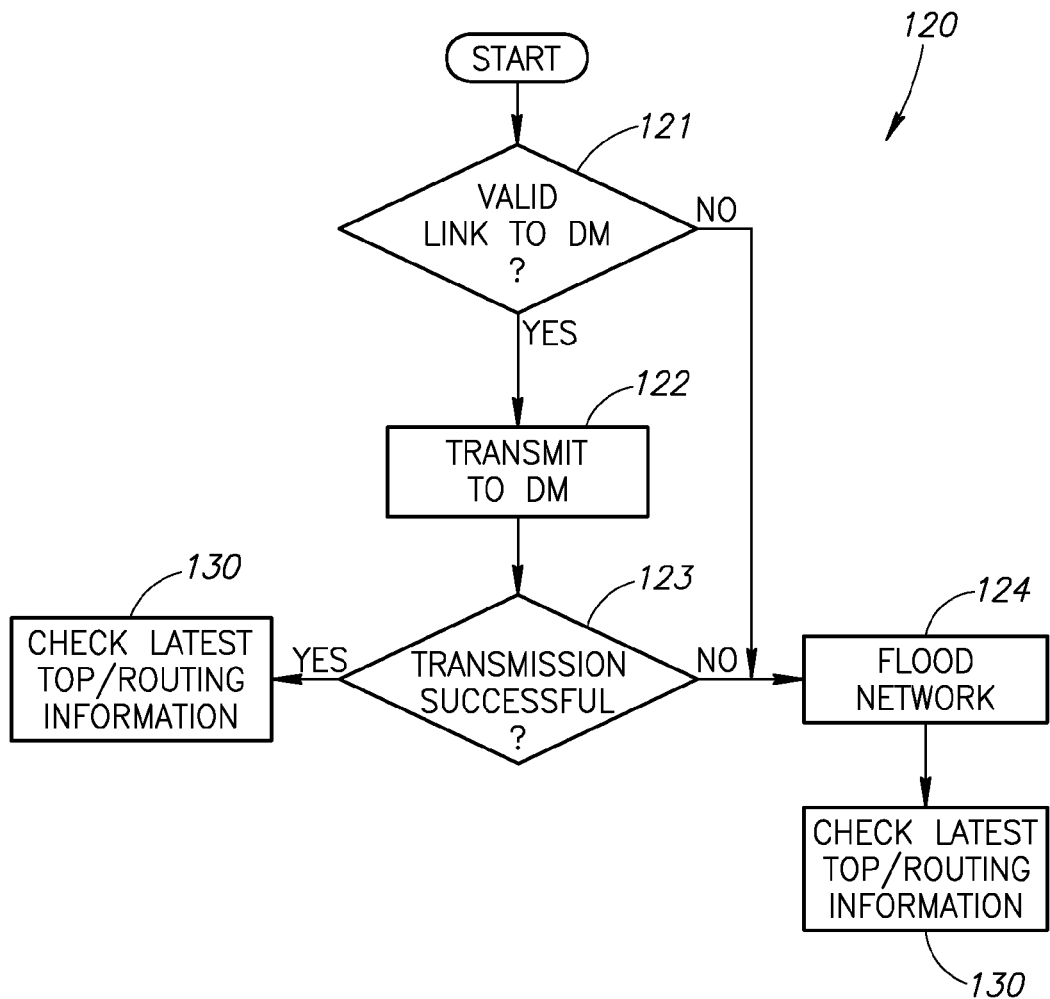

Reference is now made to FIG. 4 which details process 120, operative in accordance with a preferred embodiment of the present invention. As indicated in FIG. 3, process 120 may be invoked in response to a multiplicity of conditions that may occur during process 200. For example, process 120 may be invoked from step 110 if topology manager 40 detects a change in topology. Similarly, process 120 may be invoked from step 135 if topology manager detects that the current topology information does not match the current version indicated on the most recently received MAP. Process 120 may also be invoked from step 160 if routing calculator 64 is unable to successfully calculate a route to the DM, i.e. if the link to DM 18' is broken. Process 120 may also be invoked on startup, i.e. the first time topology manager 40 performs step 110. A topology change may always be detected upon startup; a node may not "remember" topologies from previous registrations.

It will be appreciated that whenever process 120 may be invoked, one or more parameters may be input to it to indicate the nature of the processing involved. For example, when invoked from step 110, the parameters may include a "New topology information" request as well as the information itself. Such information may include, for example, the details of a broken link recently identified by the node. When invoked from steps 135 or 160, the parameters may include a "topology update" request, an indication of the step from which it was invoked, and an identifier for the requesting node.

In process 120, TRM 30 may initially access routing manager 60 to determine (step 121) whether or not a valid link or route exists to DM 18' and if so, it may use interface 50 to transmit (step 122) the relevant request via the identified link/route. In accordance with a preferred embodiment of the present invention, a valid link to the domain master may be assumed to exist if the node either directly receives MAPs from the DM or if it indirectly receives repeated MAPs (RMAPs) that may have been relayed by other nodes.

It will be appreciated that, in some cases, routing manager 60 may be unable to provide a valid link/route. For example, at the very beginning of process 200 there may not yet be an identified link/route to DM 18'. The topology change identified in step 110 may have involved an inability to contact DM 18'. Furthermore, invoking process 120 from step 160 may indicate that routing manager 60 may have already unsuccessfully tried to resolve a route to the DM. In such cases, processing may continue directly from step 121 to step 124 (flooding) as discussed in detail hereinbelow.

Interface 50 may indicate (step 123) whether or not the transmission was successful. If successful, process 120 may exit to step 130 (FIG. 3) to await updated topology/routing information to be received from DM 18'. It will be appreciated that transmitting to the DM may require more than one "hop". For example, in FIG. 1, a transmission from node 10 to node 18 may be relayed via nodes 14 or 15. It is therefore possible that, even though the transmission to the relay node (i.e. node 14 or 15) may be successful, the next hop may fail. In such a case, TRM 30 may detect in steps 130 and 135 (FIG. 3) that DM 18' may not have been updated with the current topology and process 120 may be invoked again. In accordance with a preferred embodiment of the present invention, if process 120 is repeatedly invoked in such manner more than a predefined limit it may be determined that the transmission of step 122 was unsuccessful.

If step 122 is unsuccessful, TRM 30 may use interface 50 to flood (step 124) the network with the relevant request to update the domain master about the broken link. The node may attempt to transmit the request and its relevant parameters (for example a "new topology request", an identifier for the node and its current topology information) to every other node with which it is in contact. For example, using the embodiment of FIG. 1, node 10 may "flood" area A by sending such a transmission to each of the nodes with which it is in communication, i.e. each node in area A.

Each of the nodes in area A may continue the "flooding" by similarly retransmitting the transmission to each of the nodes with which they are in communication, except for the node(s) from which it received the flooded message. For example, in FIG. 1 nodes 14 and 15 may be located in both areas A and B. Accordingly, in such manner, either or both of these nodes may succeed in forwarding the transmission to DM 18' in area B.

After flooding may be initiated in step 124, processing may continue after a pre-defined pause in step 130 of process 200. If revised topology/routing information including the requested update has been received from the DM, process 200 may continue as disclosed hereinabove. If the topology/routing information is not current (step 135), i.e. not updated with the expected information, process 120 may be invoked again to continue the flooding process. During "flooding" it may be assumed that a valid link may not exist with DM 18'. Accordingly, processing may flow directly to step 124 and the network may be flooded (step 124) again. This processing may continue repeatedly until updated topology/routing information may be received from DM 18'. Accordingly, once a "flooding" node receives routing information from the DM that contains the identified topology message it will discontinue flooding the identified topology message.

It will be appreciated that the timing between flooding cycles may be regulated by adding pauses before at least one of the steps. For example, processing may pause for 250-500 milliseconds before step 130 to provide a window of time for DM 18' to receive the update request, calculate new optimal routes and transmit to the node.

It will be appreciated that the processing capabilities of the different nodes participating in the network may vary. Some nodes may be capable of calculating generally optimal routing plans without having to rely on plans distributed by DM 18'. It will also be appreciated, that in some network environments there may be a high level of relatively frequent interference that may render dependence on a central DM unreliable. Applicant has realized that in such situations a "hybrid" approach, incorporating a central DM with distributed routing may be advantageous. Therefore, in accordance with a preferred alternate embodiment of the present invention, every node that may experience a change in its topology information may send topology updates to all of the other nodes by a flooding method, regardless of whether or not it may capable of sending the updates to Domain Master 18', either directly or indirectly via relay nodes.

The ongoing processing for the hybrid approach may be generally similar to that of process 200. However, instead of using process 120 when necessary to contact the DM, step 124 may be invoked directly to flood the network regardless of the status of connection with the DM. Processing may then continue to step 130 as in process 120 following flooding.

In such an embodiment DM 18' may continue to calculate and distribute optimal routing plans based on the received topology. However, since the entire network may be flooded with updates on a regular basis, a typical node may have generally up-to-date information even if it may not have a reliable route to/from DM 18'. Each node shall use routing plans distributed by DM 18'. However, where a node may determine that the last distributed routing plans are not valid, then the node may replace the distributed routing plans with recalculated routes based on ongoing topology updates. Such "locally" calculated routes may then be replaced the next time an update may be received from DM 18'.

In accordance with a preferred embodiment of the present invention, the routing plans distributed by DM 18' may be compressed to reduce the bandwidth requirements for repeated distribution. It will be appreciated that such compression may significantly reduce the overhead for routing updates in an environment that may suffer from frequent interference.

The routing plans may be compressed using the following method: The routing plans that may be distributed by the DM may not specify every single possible route between two given nodes in the domain. Instead, the routing plans may indicate how every given node may reach any other given node in the domain by specifying only the next relay node along an optimal path towards the final destination node. Although the routing plans may therefore include only the next hop in the optimal path towards each node, it will be appreciated that the information may also provide indications of alternative non-optimal routes due to propagation of the information.

Figure 5:
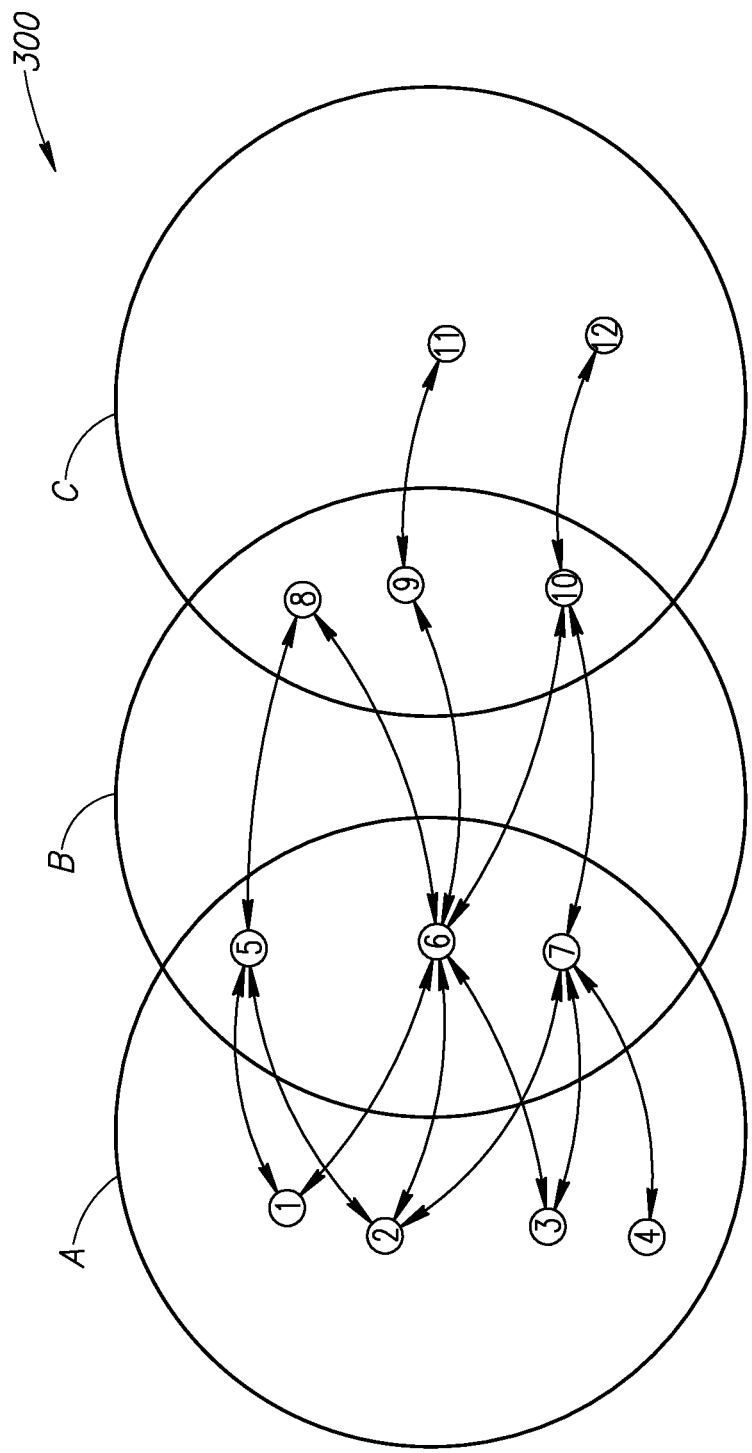
FIG. 5 is a schematic illustration of routing for an exemplary network topology.

Reference is now made to FIG. 5 which illustrates an exemplary network topology 300. Each node in areas A, B and C may communicate with any other node in the same area. Some nodes, such as nodes 5, 6, and 7, may be in the intersection between two areas; such nodes may be used to relay transmissions between other nodes located in just one of the same two areas. For example, node 5 may relay transmissions between nodes 1 and 8. The arrows may indicate optimal routing as determined by the DM for the depicted domain.

As discussed hereinabove, there may be many factors affecting optimal routing in a network, including, for example, physical (PHY) metrics (such as signal to noise ratio, actual rate, etc.), available bandwidth, quality of service constraints, local PHY conditions, and the need to balance the requirements for each of the participating nodes. The present invention may employ any appropriate algorithm for determining routing between nodes. It will be appreciated that since the primary routing function may be performed by the DM on behalf of all the nodes in the domain, the required application may be implemented in just the domain master. Accordingly, only one node (the domain master) may be affected when the application may be updated or replaced.

Reference is now made to FIG. 6 which illustrates an exemplary optimal routing table 400 for the domain of FIG. 6 as determined by a routing algorithm on the DM. The rows of table 400 may represent transmitting nodes; the columns may represent a target node to receive a transmission. Each entry in the table may specify the relay node that may relay the transmission from the transmitter (line index) to the destination node (column index). Table 400 may be distributed by the DM and may be interpreted by routing interpreter 62 (FIG. 2) as necessary to determine the route by which a transmission may be sent to any other node in the domain.

It will be appreciated that most of the entries in table 400 may be empty. A null, or empty, entry may indicate a direct connection between the transmitting and receiving node. For example, the entry for row 2, column 5 may be empty, thus indicating that nodes 2 and 5 may be in the same area (for example, area A in FIG. 5) and may communicate directly without intermediate relay nodes. The entry for row 2, column 8 may be "5", thus representing an optimal route for transmitting from node 2 to node 8 via node 5.

In some cases, multiple hops may be required for the transmission. For example, the transmitting from node 2 to node 11 may require two intermediate relay nodes. In such a case, only the first intermediate relay node may be indicated in table 400, i.e. "6" as shown in row 2, column 11. It may not be necessary to add an explicit entry for the second hop (i.e. "9") because table 400 may already comprise the information required to determine the full route. In order to transmit from node 2 to node 11, node 2 may transmit to node 6. Upon receipt of the transmission, routing interpreter 62 on node 6 may use its copy of table 400 to determine that the optimal route from node 6 to node 11 may be via node 9 and transmit accordingly. When node 9 may receive the transmission, it may use its copy of table 400 to determine that node 11 may be in the same area (i.e. area C as per FIG. 5) and relay the transmission directly to node 11.

It will be appreciated that the exemplary labeling of the nodes in the domain of FIG. 5 may be generally simplistic for illustration purposes. Nodes may typically be identified by character strings longer than just one or two digits. Accordingly, it will be appreciated that using null entries instead of explicit entries to indicate nodes in the same area of the domain may significantly reduce the size of table 400. Furthermore, the implicit provision of additional hop routing may significantly simplify the data structure required for table 400, further serving to reduce its size. Accordingly, the distribution of optimal routing logic via table 400 may significantly reduce the duration of such transmissions, thus reducing overhead in terms of exposure to network congestion.

Unless specifically stated otherwise, as apparent from the above discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for routing communications on a network node in a communications network, said method comprising:
updating a central domain master regarding changes detected in topology;
attempting to receive at all network nodes in the communications network a same routing plan from said central domain master, wherein said same routing plan includes data describing a route between each of said network nodes and all other nodes in said communication network, and wherein said routing plan is calculated at least in accordance with said changes;
receiving at least one of a media access plan (MAP) and a repeated MAP (RMAP) generated by said central domain master, said MAP and RMAP including at least an indication of a most recent routing plan;

comparing said indication of a most recent routing plan with information associated with a version of said received same routing plan; and requesting an updated routing plan from said central domain master responsive to said comparison.

2. The method according to claim 1 and wherein said updating comprises transmitting said changes according to a route included in said routing plan.

3. The method according to claim 1 and wherein said updating comprises:

flooding said communications network with a transmission detailing said changes.

4. The method according to claim 3 and wherein said flooding is performed only when said routing plan does not include a known usable route to said central domain master.

5. The method according to claim 3 and wherein said flooding is performed whenever said changes are detected.

6. The method according to claim 3 and wherein said flooding comprises:

transmitting said changes to all other said network nodes in direct communication with said network node; and indicating to said other network nodes that they should retransmit said changes to said central domain master;

wherein said retransmitting is via at least one of: a route from said routing plan, and repeating said flooding.

7. The method according to claim 3 and also comprising repeating said flooding until an indication is received that said central domain master received said changes.

8. The method according to claim 7 and wherein said indication is an updated said routing plan reflecting said changes received from said central domain master.

9. The method according to claim 1 and also comprising detecting said changes via at least one of:

successfully communicating with other said network nodes;

experiencing a failed transmission with one said other network node; and monitoring communications between at least two said other network nodes.

10. The method according to claim 1 and also comprising:

initiating said updating when an indication does not indicate that said routing plan reflects at least said changes, wherein said indication is included as part of said routing plan.

11. The method according to claim 1 and also comprising interpreting null entries in said routing plan as direct connections between two said network node, wherein said routing plan includes at least a node to node routing table.

12. The method according to claim 1 and also comprising:

detecting a broken link in said routing plan;

using said routing plan to calculate an alternate route that circumvents said broken link; and transmitting in accordance with said alternate route.

13. The method according to claim 1 and wherein said communications network is a G.hn network.

14. The method according to claim 1 wherein said routing plan comprises an indication of a first hop for each said route between each two said network nodes.

15. The method according to claim 1 wherein said indication comprises a serial number of said most recent routing plan.

16. A method for routing communications between network nodes in a communications network, said method implementable on a central domain master, the method comprising:

calculating a routing plan based on at least transmissions received regarding changes detected in topology from said network nodes;

distributing a same routing plan to all network nodes in the communications network, wherein the central domain master is one of said network nodes-and wherein said same routing plan includes data describing a route between each of said network nodes and all other nodes in said communication network;

transmitting at least one of a media access plan (MAP) and a repeated MAP (RMAP) by said central domain master, said MAP and RMAP including at least an indication of a most recent routing plan; and transmitting an updated routing plan upon receiving a request responsive to a comparison of said indication of a most recent routing plan with information associated with a version of said distributed same routing plan.

17. The method according to claim 14 and wherein said calculating comprises;

determining preferred routes between each pair of said network nodes; and entering an indication of a first hop for each said preferred route in said routing plan, wherein if necessary successive hops are determinable from other said indications entered for other said pairs of network nodes along said preferred route.

18. The method according to claim 17 and wherein when said preferred route consists of only one hop, said indication is a null indication.

19. The method according to claim 16 and wherein said communications network is a G.hn network.

20. The method according to claim 16 wherein said version information comprises a serial number of said most recent routing plan.

* * * * *